United States Patent
Bar-Sagi

(10) Patent No.: US 7,925,052 B2
(45) Date of Patent: Apr. 12, 2011

(54) PASSIVE METHOD FOR WIND MEASUREMENT

(75) Inventor: Jonathan Bar-Sagi, Yavne (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 973 days.

(21) Appl. No.: 11/721,464

(22) PCT Filed: Dec. 22, 2005

(86) PCT No.: PCT/IL2005/001370
§ 371 (c)(1),
(2), (4) Date: Jun. 12, 2007

(87) PCT Pub. No.: WO2006/070354
PCT Pub. Date: Jul. 6, 2006

(65) Prior Publication Data
US 2009/0290760 A1    Nov. 26, 2009

Related U.S. Application Data

(60) Provisional application No. 60/639,307, filed on Dec. 28, 2004.

(30) Foreign Application Priority Data

Jan. 3, 2005 (IL) .......................................... 166109

(51) Int. Cl.
*G06K 9/00* (2006.01)
(52) U.S. Cl. ........................................ 382/107; 382/103
(58) Field of Classification Search .................. 382/103, 382/107
See application file for complete search history.

(56) References Cited

U.S. PATENT DOCUMENTS 4,925,296 A * 5/1990 Reichmuth ..................... 356/28
5,159,407 A   10/1992 Churnside et al.

* cited by examiner

*Primary Examiner* — Tom Y Lu
(74) *Attorney, Agent, or Firm* — Dekel Patent Ltd.; David Klein

(57) ABSTRACT

A method for measuring wind velocity including using a Fourier Transform (FT) and a correlation between a wave vector number and temporal frequency of a wind to calculate wind velocity. Contour line deviations in a series of images of a far object are evaluated by performing a spatial discrete fourier transform (DFT) on deviations within each image, and subsequently a time discrete fourier transform (DFT) on the Fourier coefficients obtained by the spatial DFT, to get the frequency dependence of each Fourier coefficient.

3 Claims, No Drawings

PASSIVE METHOD FOR WIND MEASUREMENT

RELATED U.S. APPLICATION DATA

This application is a 371 of PCT/IL2005/001370 Dec. 22, 2005, which claims benefit of 60/639,307 Dec. 28, 2004.

FIELD OF THE INVENTION

This invention relates generally to methods for wind measurement.

BACKGROUND OF THE INVENTION

The ground temperature is different from the air temperature above it. Heat transfer causes the lower air layer to change its temperature and to differ from layers above it.

Mixing of air layers due to several processes (wind, elevation of hot air, etc.) creates streams of air that circulate within the atmosphere in a closed form. These whirlwinds or eddies, first created at large size ($L_0$—outer scale,) are not stable and decay to smaller sizes in a cascade process, until they reach a smallest size ($l_0$—inner scale) and finally dissipate. The scales $L_0$ and $l_0$ depend on local conditions and are hard to predict. The whole phenomenon is called turbulence.

The turbulence eddies have a different density than its surround air and therefore somewhat different index of refraction (Hot air is less dense than cold air—at a fixed pressure). For example, during day time, when the ground is hotter than the air, the eddies density is less than that of the surrounding air. The effect of these eddies, with different indices of refraction, on light rays passing through them, is that the eddies act as weak lenses.

The appearance of these "lenses" along a line of sight is random and the effect changes with time. Typically many such weak "lenses" are present along a line of sight.

Passive methods for wind measurement based on the phenomenon of the wind acting as a refractive lens are known. For example, U.S. Pat. No. 5,469,250 to Holmes, describes a passive wind profilometer that measures wind transverse to a line of sight as a function of range. Schlieren which are natural occurrences in wind act as refracting lenses which move along with the wind. The patches of refracted light are detected by use of a light-intensity-sensitive television. camera and a microprocessor. The range of the schlieren are determined from the scale size of the refracted patches of light. The microprocessor, using a specific algorithm for processing the light intensity data, then statistically compares the positions of the schlieren at different times to determine the wind velocity.

However, the Holms patent tends to be inaccurate, inter alia, because it tends to pick up artifacts that are not related to the wind velocity.

SUMMARY OF THE INVENTION

The present invention seeks to provide a novel passive method for wind measurement, as described hereinbelow. Unlike the prior art, the present invention picks up only frequencies that are related to wind velocity, and eliminates changes due to internal structure changes of the turbulence eddies. In accordance with one non-limiting embodiment of the invention, the method measures wind velocity by using a Fourier Transform (FT) and a correlation between wave vector number and temporal frequency.

DETAILED DESCRIPTION OF EMBODIMENTS

Freezed Turbulence Model

The turbulent eddies are dragged with the wind, so that their center moves in the wind velocity. These eddies crosses a given line of sight (L.O.S), in a speed equal to the perpendicular wind vector component. Ignoring the internal dynamics of the turbulence, as described above, the typical time a given eddy disturbs the light along the L.O.S is proportional to the eddy size divided by its velocity component perpendicular to the L.O.S.

This model, named Freezed Turbulence, is an approximation which usually holds for large eddies (that have long life time) but may fail for the smallest ones.

Turbulence Effects on Images

Taking a picture of a far object through a turbulent atmosphere, the image is distorted in several ways:

1) Intensity fluctuations (Stars blinks due to this effect).
2) Position change due to light rays shifting by the turbulence eddies ("lenses").
3) Glare.

The second effect (position change) is used here to measure the perpendicular wind velocity component.

As a turbulence eddy crosses a camera field of view, it actually crosses many (nearby) lines of sight. We will diagnose two orthogonal cases:

1) A horizontal line target (object).
2) A vertical line target.

It is noted that the eddy is dragged horizontally with the wind.

1. The perturbation to the picture moves along the horizontal line when the eddy passes, with a speed proportional to the wind velocity component perpendicular to the L.O.S.

2. The perturbation created by the eddy, on a horizontal line, exists at a time period inversely proportional to that wind velocity component.

The present invention takes advantage of the relation between the perturbation size and the perturbation speed of change.

In order to correlate size (as seen by the camera) to period of time, we use the Fourier transformation (spatial and temporal). As our space is divided into quantized quantities by the hardware (pixels) and the time is quantized by the movie frame rate (time between pictures) we are using a discrete version of this technique.

Discrete Fourier Transform (DFT)

For length N input vector x, the DFT is a length N vector with elements $$j = \sqrt{-1}; X(k) = \sum_{n=1}^{N} x(n) * \exp(-j * 2 * pi * (k-1) * (n-1)/N),$$

$$1 <= k <= N.$$

If the x vector is in time space, that is, the indices (n) of the elements stand for discrete points on the time axis, then the indices of the resulted X (k) are points along a so-called frequency axis (usually using f instead of k).

If the x vector is in real space, that is, the indices (n) of the elements stand for discrete points along an axis, then the indices of the resulted X (k) are points along a so-called wave-vector axis.

The transformed vector elements (Fourier coefficients) are complex numbers with amplitude, A, and phase, φ:

$$X_k = A_k e^{i\phi_k}$$

The squares of the amplitudes are called Power Spectrum.

In real space, an object draw of length D centered at $x_0$ will have significant DFT element X(k) at k=2π/D with phase $\phi_k = 2\pi k x_0$. Other elements for higher k values may appear according to the internal structure of the draw.

The number of significant Fourier elements is equal to the number of original data points. If the data points are real numbers, however, the second half of the Fourier coefficient is equal to the first half.

Taking a movie of a far object, the contour lines seem to move due to the atmospheric turbulence. On the average, however, they maintain the right position.

By registration of the contour line positions, pixel by pixel, in each picture and measure the deviation with respect to the average contour, one may obtain a matrix of numbers wherein each element represents a tangent (to the contour line) deviation at a given contour point at a given time (picture of movie). In other words, each row contains the deviations along the contour in a given picture (time), and each column contains the changes history of a given point on the contour. (Columns and rows can be interchanged of course).

For example if the contour is a straight line along the x axis, a row of the matrix includes the deviations in the y direction (caused by turbulence) in one picture of the movie.

For the explanation to be clear we can look at any portion of the contour as a straight line (the tangent) segment. This straight segment can be viewed as a composition of horizontal and vertical segments (vector decomposition).

The treatment and explanation for horizontal (in the plane containing the wind velocity vector) and for vertical (perpendicular to the wind velocity vector) lines are somewhat different.

In both cases the main point is that turbulence is a phenomenon of many closed form air eddies. Each eddy projects a disturbance on the recording imaging system of size proportional to its own size.

Before going into details, a mathematical explanation is presented.

Spatial DFT of Recorded Data:

Taking a row m (t=τm is the time where X is the leg between pictures) in the data matrix of deviations and making a Discrete Fourier Transform operation on it, one may get some significant Fourier elements, {X(t,k)} in accordance with the size of the disturbances. Each element can be separated into amplitude and phase:

$$X(m,k) = A_k(t) e^{i2\pi k x_0(t)}; \quad t = m\tau$$

For a single eddy disturbance, we can clearly separate two cases:

1) A vertical line—the disturbance starts and ends at same height so that $x_0$ is fixed. What is changed during time is the amplitude, A, that grows up and than grows down until it disappear when the eddy goes away. The most significant amplitude is for k=2π/D where D is proportional to the eddy size.

2) A horizontal line—the disturbance stays for long time changing its position along the line: $x_0 = V_x t$ wherein $V_x$ is the velocity of deformation motion (proportional to the velocity that the eddy crosses the field of view of the camera). So that:

$$\phi_k = 2\pi k V t$$

The most significant (with highest amplitude) k is again the one with k=2π/D.

Time DFT

After operating the DFT process for all rows, we obtain a matrix with elements X(m,k), where m=t/τ is the time index.

We now perform another DFT along columns. This gives use the frequency dependence of each k Fourier coefficient. For each coefficient there is a typical frequency that measures its rate of change. One way to calculate the average frequency, which is used here, is according to a weighted average:

$$fk = \frac{\sum_{f=0}^{f_{max}} f P(f,k)}{\sum_{f=0}^{f_{max}} P(f,k)}$$

Here $P=|X|^2$ is the power spectrum elements.

1) Horizontal line—for the simple case studied above for this kind of target the time dependence is only in the phase and the DFT yields a Kroneker delta function:

$$\delta(2\pi f - 2\pi k V)$$

so that only $f_k = kV$ Fourier element should present for each k. In real life there are some other contributions but the averaging process will give the right value.

2) For the horizontal line case the typical frequency is inversely proportional to the time this element exists, that is the disturbance with size of length $D_y = 2\pi/k$ This time depends on eddy size and velocity so that:

$$T_{in} = D_x / V_x; \quad f = \frac{2\pi}{T_{in}} = \frac{2\pi V_x}{D_x}$$

The fact that we are dealing with a circulating air stream enforces the relation:

$$D_x \approx D_y$$

So putting $D_y$ instead of $D_x$ and further express it using k one gets:

$$f_k = k V_x$$

Again this is an approximated way to estimate the expected average frequency while the exact proof is more complicated.

So for both vertical and horizontal lines the velocity is given by:

$$\text{For any } k \cdot V_x \propto \frac{\langle fk \rangle}{k}$$

The algorithm further takes the average of the results for $V_x$ from several values of k.

The k values in use of the algorithm were picked according to a "life time" of turbulent eddies, according to their size and other factors, such as target line length, compared to expected outer scale ($L_0$) of the eddies.

Some applications of the invention include, without limitation:

Fire control system—to correct for wind drag of bullets, shells and rockets.

Movies correction—using the k–ω relations to correct movies pictures that are distorted by turbulence.

Simulation of turbulence effects on movies—Taking a "clean" movie and adding turbulence effects to it for using in simulators.

What is claimed is:

1. A method for measuring wind velocity comprising:

taking a picture of a far object through a turbulent atmosphere, wherein a position of said object in the picture changes due to light rays being shifted by a turbulence eddy, said eddy being dragged along a horizontal line, wherein a perturbation to the picture that moves along the horizontal line has a speed proportional to the wind velocity component perpendicular to the line and exists for a time period inversely proportional to that wind velocity component, wherein the eddy projects a disturbance on the recording imaging system of size proportional to its own size;

obtaining significant Fourier elements in accordance with the size of the disturbance; and obtaining the frequency dependence of each k Fourier coefficient and calculating therefrom wind velocity.

2. The method according to claim 1, wherein for each k Fourier coefficient there is a typical frequency that measures its rate of change, calculating the average frequency, and calculating therefrom wind velocity.

3. The method according to claim 2, comprising calculating a weighted average frequency, and calculating therefrom wind velocity.

* * * * *